(12) United States Patent
Karaoguz et al.

(10) Patent No.: US 7,221,946 B2
(45) Date of Patent: May 22, 2007

(54) AUTOMATIC QUALITY OF SERVICE BASED RESOURCE ALLOCATION

(75) Inventors: Jeyhan Karaoguz, Irvine, CA (US); James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 189 days.

(21) Appl. No.: 10/875,891

(22) Filed: Jun. 24, 2004

(65) Prior Publication Data

US 2005/0064873 A1    Mar. 24, 2005

Related U.S. Application Data

(60) Provisional application No. 60/504,876, filed on Sep. 22, 2003.

(51) Int. Cl.
   *H04Q 7/20* (2006.01)
(52) U.S. Cl. ............... 455/452.2; 455/452.3; 455/462; 455/452.1
(58) Field of Classification Search ............. 455/452.2, 455/452.3, 462, 452.1
   See application file for complete search history.

(56) References Cited

U.S. PATENT DOCUMENTS

| | | | |
|---|---|---|---|
| 5,475,677 A * | 12/1995 | Arnold et al. | 370/280 |
| 6,445,921 B1 * | 9/2002 | Bell | 455/426.1 |
| 6,931,249 B2 * | 8/2005 | Fors et al. | 455/436 |
| 2004/0165563 A1 * | 8/2004 | Hsu et al. | 370/338 |
| 2005/0059400 A1 * | 3/2005 | Jagadeesan et al. | 455/436 |

\* cited by examiner

*Primary Examiner*—Lester G. Kincaid
*Assistant Examiner*—Dung Lam
(74) *Attorney, Agent, or Firm*—McAndrews, Held & Malloy, Ltd.

(57) ABSTRACT

A system and method for providing quality-of-service based network resource allocation and utilization in a dynamic network environment. For example, a wireless communication network may comprise a first system and a second system. The first system may provide a current service to a user at a current quality level. The first system and second system may establish a wireless communication link. At least one of the first and second systems may determine whether utilizing one or more resources of the second system will provide the current service to the user at a higher level of quality than the current quality level. One or more resources of the second system may be allocated for providing the current service to a user at a higher quality level. The allocated resources may be utilized to provide the current service to the user at a higher quality level than the current quality level.

43 Claims, 5 Drawing Sheets

AUTOMATIC QUALITY OF SERVICE BASED RESOURCE ALLOCATION

CROSS-REFERENCE TO RELATED APPLICATIONS/INCORPORATION BY REFERENCE

This patent application is related to and claims priority from provisional patent application Ser. No. 60/504,876 filed Sep. 22, 2003, and titled "AUTOMATIC QUALITY OF SERVICE BASED RESOURCE ALLOCATION," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

In a dynamic network environment, various processing resources may freely enter and leave a network. Such resources may have superior or inferior service providing capabilities to other resources already present in the dynamic network. For example, a system providing relatively low quality audio service may enter a dynamic wireless network that includes one or more systems capable of providing a relatively high quality audio service. Also, for example, a system entering a dynamic wireless network may have the capability to deliver relatively high quality video, email, or numerical processing capability to a user. Additionally, for example, a system with access to relatively low quality information may enter a dynamic wireless network having a system resource with access to relatively high quality information.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for allocating and utilizing resources in a dynamic communication network. For example, a wireless communication network may comprise a first system and a second system. The first and second systems may, for example, be portable or stationary systems. The first system may provide a current service to a user at a current quality level. Such a current service may, for example, include any of a variety of audio, video, textual, graphical or communication services.

A wireless communication link may be established between the first and second systems. For example, the first and second systems may comprise respective communication modules to establish such a wireless communication link. The wireless communication link may be based on any of a number of standard and proprietary wireless communication protocols.

The first and second systems may, for example, communicate capability information, and at least one of the first and second systems may determine whether utilizing one or more resources of the second system will provide the current service to the user at a higher level of quality than the current quality level. For example, the first and second systems may comprise respective quality control modules that utilize respective communication modules to communicate capability information. Such capability information may comprise, for example and without limitation, processing capability, communication capability, and information access capability information. One or both of the quality control modules may, for example, determine whether utilizing one or more resources of the second system will provide the current service to the user at a higher quality level.

One or more resources of the second system may be allocated for providing the current service to a user at a higher quality level. Such an allocation may, for example, be in response to a determination (e.g., made by a quality control module) that utilization of the allocated resource(s) will provide the current service to the user at a higher quality level. For example, at least one of the first and second systems may comprise a resource allocation module to perform such a resource allocation.

The allocated resource(s) may be utilized to provide the current service to the user at a higher quality level than the current quality level. For example, the first and second systems may comprise respective distributed processing modules that manage such resource utilization. For example, the respective distributed processing modules may communicate information of pre-processed and post-processed information between the first and second systems.

These and other advantages, aspects and novel features of the present invention, as well as details of illustrative aspects thereof, will be more fully understood from the following description and drawings.

DETAILED DESCRIPTION OF THE INVENTION

Figure 1:
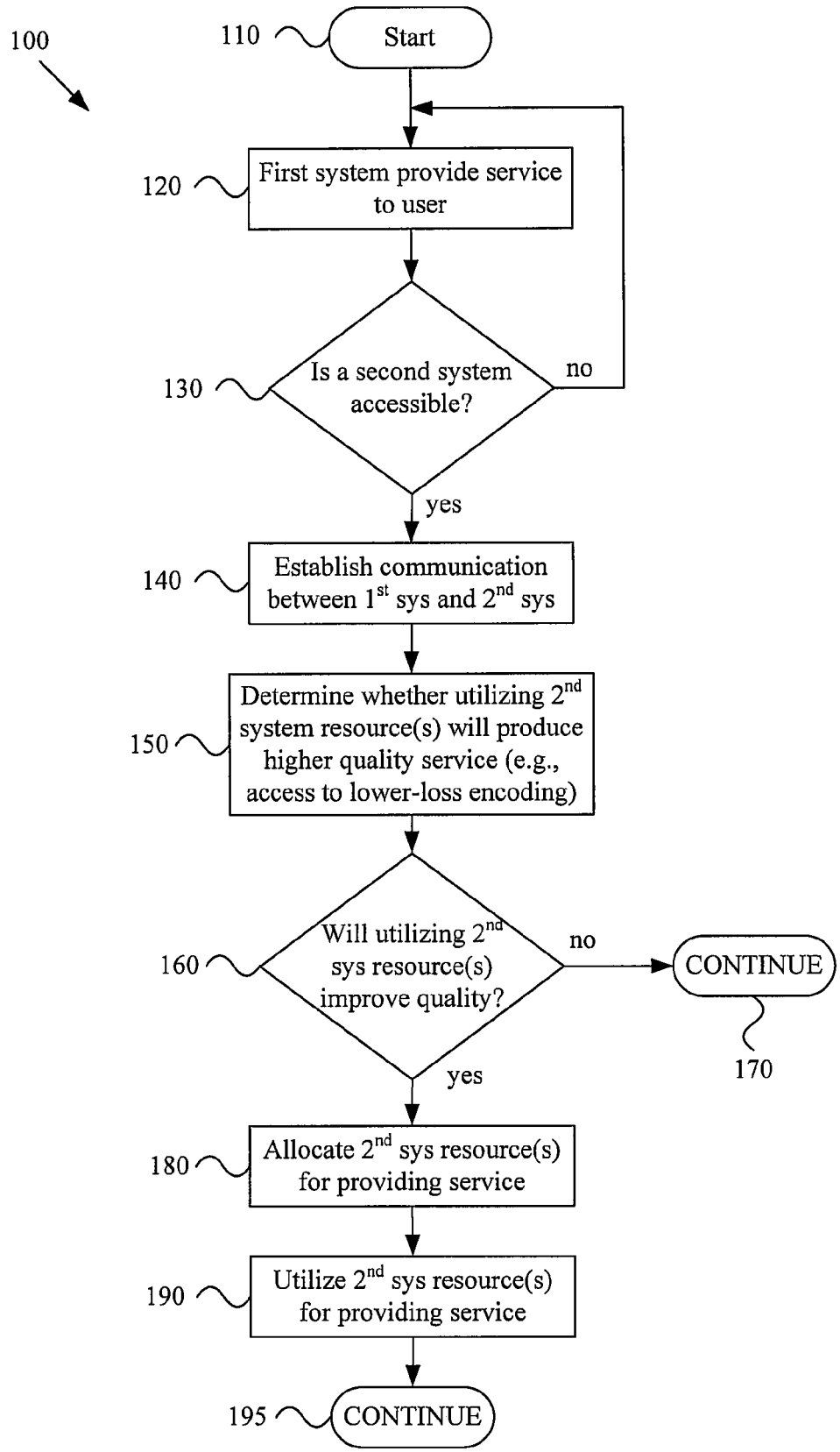
FIG. 1 is a flow diagram illustrating a method for quality of service based resource allocation and utilization in a dynamic wireless network environment, in accordance with various aspects of the present invention.

FIG. 1 is a flow diagram illustrating a method 100 for quality of service based resource allocation and utilization in a dynamic wireless network environment, in accordance with various aspects of the present invention. The method 100 begins at step 110. Various events and conditions may cause the method 100 to begin. For example, a user may request that a first system provide a service to the user, or the first system may automatically decide to provide a service to a user. Generally, the method 100 may be initiated for a variety of reasons. Accordingly, the scope of various aspects of the present invention should not be limited by characteristics of particular initiating events or conditions.

The method, at step 120, may comprise the first system providing a service to the user. A "service" is generally a function performed by the first system for the ultimate benefit of the user. For example and without limitation, a service may comprise an audio output service, a video output service, a textual interface service, an audio interface service, a video interface service, a data processing service, an email service, etc. Accordingly, the scope of various aspects of the present invention should not be limited by characteristics of a particular provided service.

Figure 5:
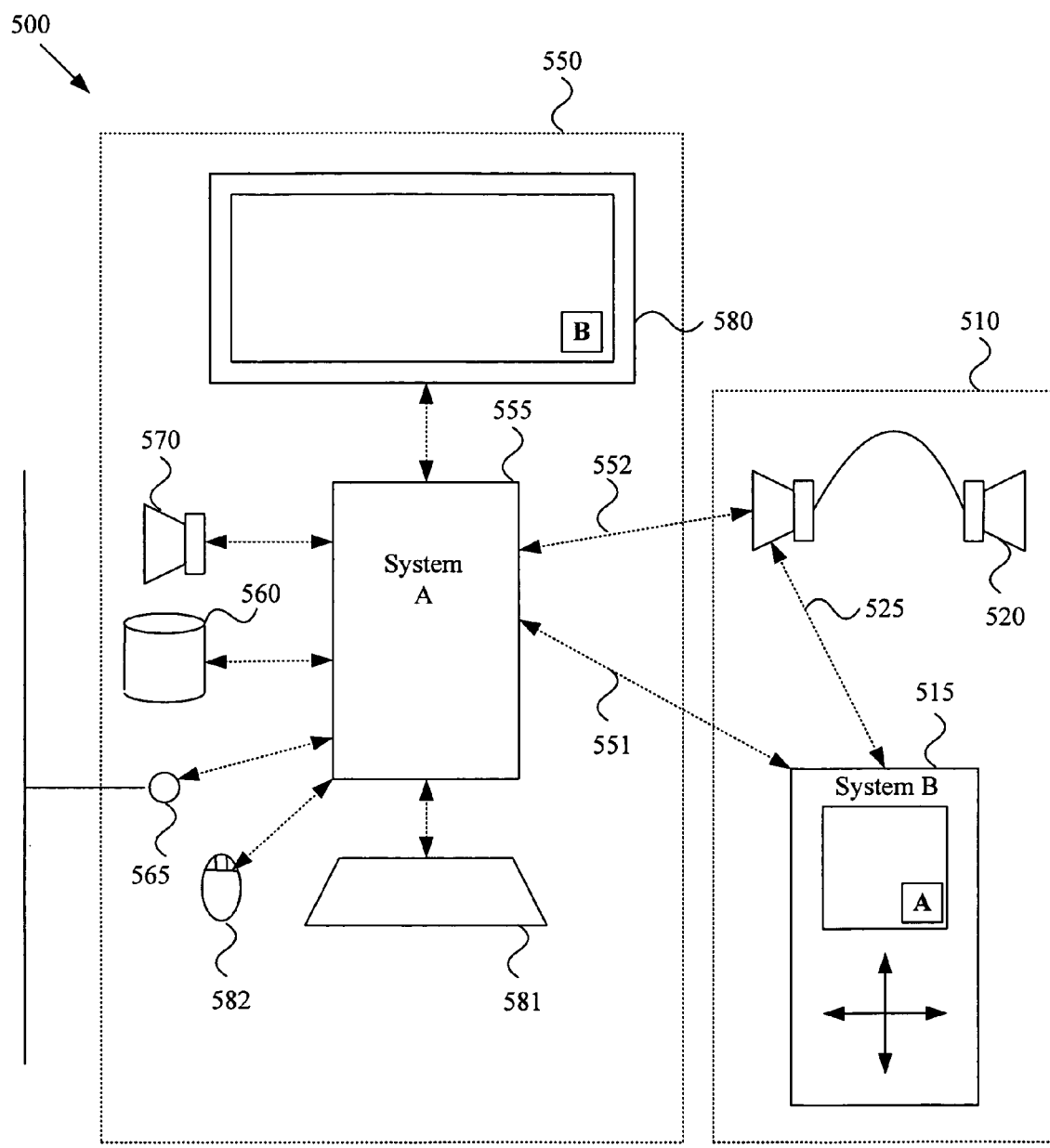
FIG. 5 is a diagram showing an exemplary audio resource allocation scenario, in accordance with various aspects of the present invention.

FIG. 5 illustrates an exemplary network scenario 500 where the first system 510 comprises a personal digital assistant ("PDA") 515 initially providing music to a user through a headset 520 communicatively coupled to the PDA 515 through a communication link 525, which may be a tethered or non-tethered link. The user may, for example, have requested at step 110 that the first system 510 provide music to the user from a song play list, which represents a portion of a store of music information local to the PDA 515. It is to be stressed at this point that the following discussion will often refer to the exemplary scenario 500 shown in FIG. 5 as an exemplary illustration of various aspects of the present invention that are in fact of much broader scope than aspects of the exemplary scenario 500 may demonstrate. Accordingly, by no means is the scope of various aspects of the present invention to be limited by characteristics of the exemplary scenario 500 shown in FIG. 5.

Referring back to FIG. 1, the method 100, at step 130, comprises determining whether a second system is accessible to the first system in the dynamic wireless communication network. Such a determination may be made, for example, utilizing various "hello," "advertising" and "beacon" protocols that wireless systems may utilize to maintain their networks. Systems of a dynamic network may utilize a variety of methods to detect the presence and availability of other systems. Accordingly, the scope of various aspects of the present invention should not be limited by characteristics of a particular method, standard or protocol for detecting the presence or availability of a system in a wireless communication network.

If step 130 determines that there is not a second system accessible to the first system, then the flow of the method 100 may return to step 120, where the first system may continue to deliver the current service to the user. Alternatively, if step 130 determines that there is a second system accessible to the first system, then the flow of the method 100 may proceed to step 140. Note that step 130 may, for example, be initiated automatically (e.g., without real-time user interaction) or may be initiated by request (e.g., by a user requesting a higher quality service).

For example and without limitation, refer to the exemplary scenario 500 of FIG. 5. The user and the first system 510 may, for example, be mobile and may move within the boundaries of a wireless communication network of which the second system 550 is a member. The first 510 and/or second 550 systems may, for example, periodically transmit an advertising message. For example, in an exemplary scenario, the second system 550 may transmit a periodic advertising message. The first system 510 may move within range to hear the advertising message and respond to the second system 550.

Referring back to FIG. 1, the method 100, at step 140, may comprise establishing a wireless communication link between the first system and the second system. Such a communication link may be based on any of a variety of wireless communication protocols and standards. For example, the first system and second system may establish a communication link based on standards, such as IEEE 802.11, 802.15, UWB, Bluetooth, or other standard or proprietary protocols. Such a communication link may also, for example, include aspects of USB and Ethernet communication links. Accordingly, the scope of various aspects of the present invention should not be limited by characteristics of a particular communication protocol, standard or method.

Referring to the exemplary scenario 500 of FIG. 5, the first system 510 and second system 550 may, for example, establish a wireless communication link 551 between the first system 510 and the second system 550 based on IEEE 802.11.

Referring back to FIG. 1, the method 100, at step 150, may determine whether utilizing the second system (or various resources thereof) will increase the quality at which the current service is being provided to the user. The first system and second system may, for example, communicate a variety of information over the communication link established at step 140 to make such a determination. Generally, the quality determination may involve any of a large variety of quality metrics (e.g., audio/video output quality, rate of response to user input, duration over which the service may be provided, number of information consumption options available to a user, variety of information that may be accessed, quality of information that may be accessed, rate at which such information may be accessed, etc.). Accordingly, the scope of various aspects of the present invention should not be limited by characteristics of one or more particular service quality metrics.

The determination at step 150 may, for example, include determining an indication of the current quality level at which the first system is currently providing the current service to the user. Such a current quality level may, for example, be compared to the expected quality at which the current service may be provided to the user by utilizing various resources of the second system.

In the exemplary scenario 500 illustrated in FIG. 5, the PDA 515 may be communicating audio information to the headset 520 over the communication link 525. The current service (e.g., the communication of audio information to the user) may, for example, utilize audio information obtained from 64 Kbps MP3 encoded information residing on the PDA 515. For example, the user of the PDA 515 may have decided to store MP3 information in the PDA 515 memory in a highly compressed state, thereby trading audio quality for the ability to store more music. The first system 510 or the second system 550 may determine the current quality of the audio information being provided to the user.

Referring back to FIG. 1, step 150 may comprise communicating quality of service information between the first system and the second system. Such quality of service information may take any of a variety of forms. For example and without limitation, the quality of service information may include information of the quality of the current service being provided to the user by the first system or the potential quality at which the current service may be provided to the user by utilizing various resources of the second system.

Step 150 may comprise communicating information between the first and second systems of whether the first or second system has processing capability, which if utilized, would result in the current service being provided to the user at a higher level of quality than the current quality level. For example and without limitation, the first and second systems may communicate information of data decoding and processing capability. Such processing capability may be, for example, related to available hardware or software resources. The first and second systems may, for example, communicate information of various computer applications that the first and second systems may execute. Such computer applications may, for example, comprise audio processing applications, video processing applications, text processing applications, numerical processing applications, etc.

Referring to FIG. 5, as an example, the PDA 515 and the desktop computing station 555 may communicate information of audio decoding capability. For example, the desktop computing system 555 may communicate information to the PDA 515 indicating that the desktop computing system 555 has the processing capability to decode and provide audio information to the PDA 515.

Referring back to FIG. 1, step 150 may, for example, comprise the first and second systems communicating information of communication capability. The first and/or second system may utilize such information to determine whether utilizing various resources of the second system will result in the current service being provided to the user at a higher quality level than the current quality level. For example, providing the current service to the user at a higher quality level than the current quality level may require a communication channel between the first and second system to have a minimum communication bandwidth. Also, for example, providing the current service to the user at a higher quality level than the current quality level may require a communication channel to have a particular level of reliability. Further, for example, providing the current service to the user at a higher quality level than the current quality level may require communication utilizing a particular set of communication protocols.

Referring to the exemplary scenario 500 illustrated in FIG. 5, the PDA 515 and desktop computing system 555 may communicate information of communication capability. For example, the desktop computing system 555 and the PDA 515 may communicate information of the type of communication links that may be established between the desktop computing system 555 of the second system 550 and the PDA 515 of the first system 510. Such communication capability information may, for example, comprise information of audio information streaming capability.

Referring back to FIG. 1, the communication capability information may also, for example, comprise information of secure communication capability. For example, in an exemplary scenario, the user or one of the first and second systems may require that communication between the systems, or from one of the systems to a user interface device, be conducted securely (e.g., utilizing at least a certain level of encryption). Such secure communication capability may then be considered when determining whether various resources of the second system may be utilized to provide the current service to the user at a higher quality level than the current quality level.

In general, step 150 may comprise communicating information of communication capability and utilizing such information to determine whether utilizing various resources of the second system will provide the current service to the user at a higher level of quality than the current level of quality. Such information of communication capability may include any of a large number of communication characteristics. Accordingly, the scope of various aspects of the present invention should not be limited by particular communication or communication link characteristics.

Step 150 may comprise communicating information between the first and second systems regarding information sources to which at least one of the first and second systems has access. For example, the second system may have access to higher quality information than the first system. As an example, such higher quality information may include information encoded utilizing a lower loss encoding technique than used to encode the information to which the first system has access. As another example, such higher quality information may include information to which the second system has access and to which the first system has no access.

The information regarding access to various information sources may also include information of the media over which such access exists. For example, access to various information sources may comprise local access or networked access. The type of access to various information sources, as well as the quality of the information, may be considered in determining whether utilizing various resources of the second system will provide the current service to the user at a higher quality level. For example, access to high quality information over a communication network may be of little value in certain scenarios if the communication network is slow or unreliable.

In general, step 150 may comprise the first and/or second system determining, based at least in part on the source information, whether utilizing various resources of the second system will result in the current service being provided to the user at a higher quality level than the current quality level. Accordingly, the scope of various aspects of the present invention should not be limited by characteristics of particular information, information sources, or particular links to such information sources.

Referring to the exemplary scenario 500 illustrated in FIG. 5, the PDA 515 may have access to a local memory device having MP3 audio information encoded at 64 Kbps encoding, while the desktop computing system 555 may have access to CD-quality music information stored in a local memory device 560 or through a network 565. The first 510 or second 550 systems may consider such information access when determining whether utilizing resources of the second system 550 will provide the current service to the user at a higher level of quality.

Referring back to FIG. 1, step 150 may comprise communicating access control information between the first and second systems. Such access control information may, for example, comprise digital certificate, certificate authority (CA) key, management/access control, CA verification information, and a variety of user or system identification information.

The first and/or second system may utilize such information to determine whether various resources of the second system may be utilized to provide the current service to the user at a higher quality level. For example, the second system may require the first system (or a user thereof) to be authorized and/or authenticated to utilize various resources of the second system. Also, for example, the user or the first system may require that the second system be authorized to provide access to various resources for use in providing the current service to the user. Such authorization may, for example, be system, service or user dependent.

In general, step 150 may comprise the first and second systems communicating access control information and utilizing such information to determine whether various resources of the second system may be utilized to provide the current service to the user. Accordingly, the scope of various aspects of the present invention should not be limited by characteristics of particular access control requirements, strategies or implementations.

Referring to the exemplary scenario 500 illustrated in FIG. 5, the second system 550 may, for example, have a list of users or systems to which the second system 550 may allocate resources. If the user of the first system 510 is not an authorized user, the second 550 or first 510 system may determine that various resources of the second system 550 are not available for providing the current service to the user.

In general, step 150 determines whether utilizing various resources of the second system will increase the quality at which the current service is being provided to the user. As mentioned previously, such a determination may, for example, include analyzing information related to processing capability, communication capability (including secure communication capability), information access, and access control. The information that step 150 may analyze to determine whether utilizing various resources of the second system will provide the current service to the user at a higher quality level is by no means limited to the previous examples. Accordingly, the scope of various aspects of the present invention should not be limited by characteristics of particular information that may be considered in making such a determination.

The method 100, at step 160, may comprise determining whether to allocate or utilize various resources of the second system to provide the current service to the user, based at least in part on the determination made at step 150. For example, if step 150 determined that utilizing various resources of the second system is not allowed or not possible, step 160 may direct the flow of the method 100 to step 170, which may provide for the first system to continue providing the current service to the user at the current quality level. Also for example, if step 150 determined that utilizing various resources of the second system would not result in the current service being provided to the user at a higher quality level, then step 160 may direct the flow of the method 100 to step 180.

Referring to FIG. 5, in the exemplary scenario 500, the first 510 or second 550 system may determine that utilizing an information resource (e.g., the local storage device 560 or network access 565) and desktop computer 555 audio decoding capability will provide the current service (e.g., music) to the user at a higher level of quality than is currently being provided to the user.

Referring back to FIG. 1, the method 100, at step 180, may comprise allocating various resources of the second system for providing the current service to the user at a higher level of quality than the current level of quality. Note that such allocation may or may not, depending on the nature of the allocated resource, impact the availability of the allocated resource for utilization with other systems. The first and second systems may, for example, communicate resource allocation information in preparation for utilizing the allocated resources to provide the current service to the user at a higher quality level.

Referring to the exemplary scenario 500 of FIG. 5, the desktop computing system 555 of the second system 550 may allocate a portion of information access resources, audio information processing resources, and audio information communication resources for use in providing the current service to the user at a higher quality level. The desktop computing system 555 may communicate information of such allocation to the PDA 515, along with information related to the effective utilization of such allocated resources to provide the current service to the user.

Referring back to FIG. 1, the method 100, at step 190, generally follows the resource allocation of step 180 with utilization of such resources of the second system to provide the current service to the user at a higher quality level. Such utilization may be accomplished in a variety of manners depending on the particular system configuration and allocated resources.

For example, various communication links may be established between the first and second systems. The first and second systems may, for example, utilize such communication links to communicate a variety of information depending on the service being provided and the system configuration. For example, the second system may provide raw data to the first system for further processing, or the second system may provide processed data to the first system for immediate presentation to the user. Alternatively, for example, the second system may provide processed information directly to the user through a user interface device.

Such resource utilization may comprise a variety of processing activities on the part of the first and/or second systems. For example and without limitation, the allocated resources of the second system may process information provided by the first system. For example, the allocated resources of the second system may acquire information from a source other than the first system and process such information. Also for example, the allocated resources of the second system may acquire information from a source other than the first system and pass such information to the first system for further processing.

Referring to the exemplary scenario 500 shown in FIG. 5, the desktop computing system 555 may, for example, retrieve raw audio information from local storage 560 or the network 565 and process such information for delivery to the PDA 515 over the communication link 551. Alternatively, for example, the desktop computing system 555 may establish a direct communication link 552 to the headset 520 to provide music information directly to the headset 520 of the user. The desktop computing system 555 may, for example, provide audio output through an audio output device 570 coupled to the second system 555, if the first 510 and/or second 555 system determines that such action would increase the level of quality at which the current service is being provided to the user.

Referring back to FIG. 1, step 190 may, for example, comprise communicating control information between the first and second systems. For example, the user may utilize the first system to control the utilization of resources of the second system. Alternatively, for example, the user may utilize resources of the second system (e.g., keyboard, mouse and display resources) to control the utilization of the allocated resources of the second system.

Referring to the exemplary scenario 500 shown in FIG. 5, a user may, for example, use various U/I devices to control the manner in which the current service is being provided to the user. For example, the user may utilize the display 516 and input 517 of the PDA 515 to control the manner in which the current service is being delivered to the user. Alternatively, for example, the user may utilize the display 580, keyboard 581 or mouse 582 resources of the second system 550 to control the manner in which the current service is being delivered to the user.

In general, step 190 comprises utilizing the allocated resources of the second system to provide the current service to the user at a higher level of quality than the current quality level. Accordingly, the scope of various aspects of the present invention should not be limited by characteristics of particular information obtaining, processing or communication scenarios.

Figure 2:
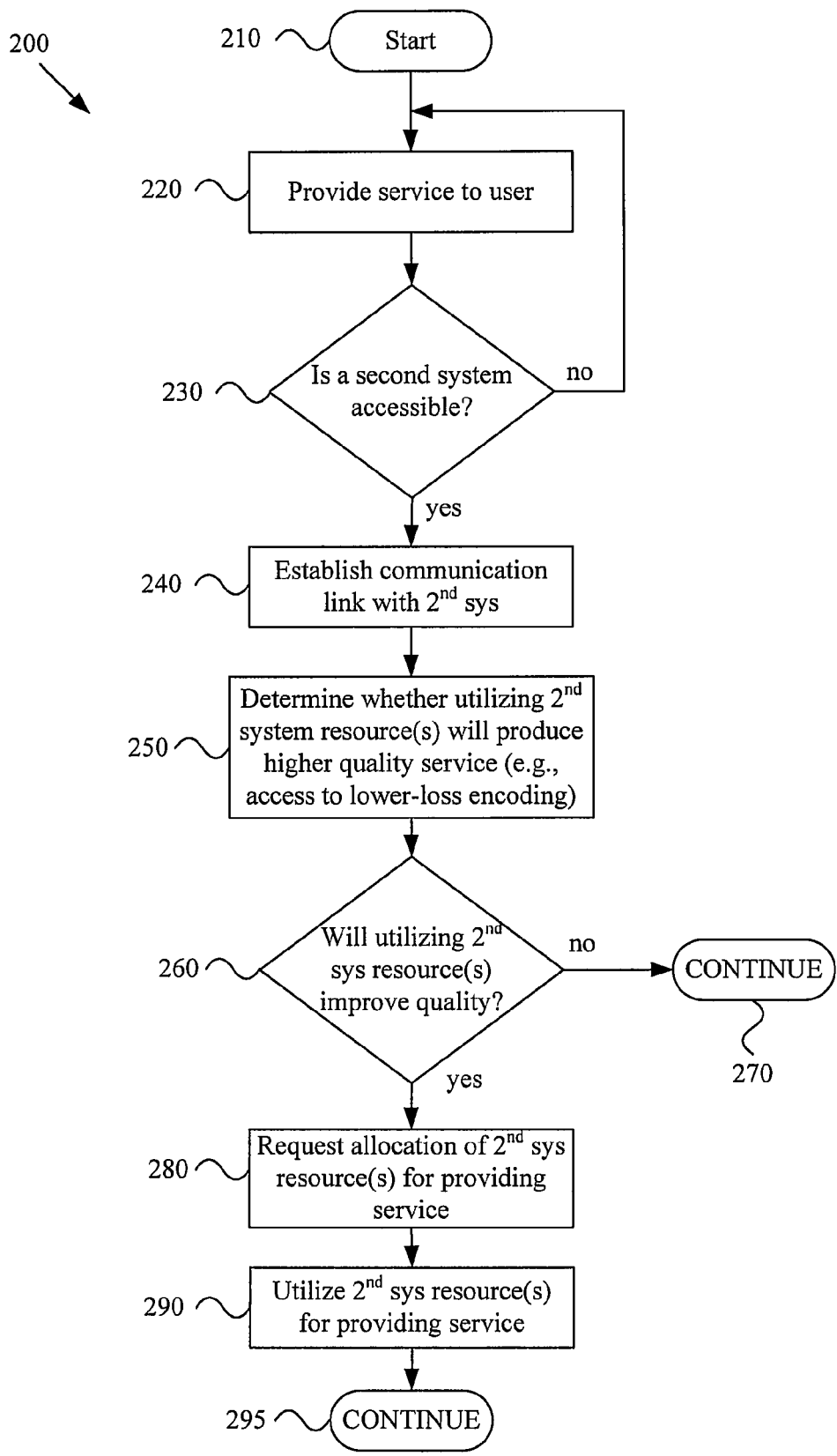
FIG. 2 is a flow diagram illustrating a method in a first system for quality of service based resource allocation and utilization in a dynamic wireless network environment, in accordance with various aspects of the present invention.

Various aspects of the method 100 illustrated in FIG. 1 may be performed by either of the first and second systems. Accordingly, the scope of various aspects of the present invention should not be limited to which particular system may be performing the various aspects of the method 100. Refer to FIG. 2 for an exemplary method 200 that may, for example, be performed in a first system of a dynamic wireless communication network. The fact that the first system may perform the various aspects of the method 200 illustrated in FIG. 2 and discussed below is not to be taken as an indication that the first system is required to perform any or all of such various aspects.

FIG. 2 is a flow diagram illustrating a method 200, which may, for example, be performed by a first system for quality of service based resource allocation and utilization in a dynamic wireless network environment, in accordance with various aspects of the present invention. The method 200 shares various aspects with the method 100 illustrated in FIG. 1 and discussed previously. The method 200 is presented herein to provide an exemplary perspective and to demonstrate one of the many options for how various aspects of the present invention may be allocated between the first and second systems. Accordingly, the scope of various aspects of the present invention should not be limited by the following example performing various aspects of the present invention in either of the first or second systems, or in a third system.

The method 200 begins at step 210. Various events and conditions may cause the method 200 to begin. For example, a user may request that a first system provide a service to the user, or the first system may automatically decide to provide a service to a user. Accordingly, the scope of various aspects of the present invention should not be limited by characteristics of particular initiating causes or conditions.

The method, at step 220, may comprise the first system providing a service to the user. As mentioned previously, a "service" is generally a function performed by the first system for the ultimate benefit of the user. For example and without limitation, a service may comprise an audio output service, a video output service, a textual interface service, an audio interface service, a video interface service, a data processing service, an email service, etc. Accordingly, the scope of various aspects of the present invention should not be limited by characteristics of a particular service provided.

Referring to the exemplary scenario 500 illustrated in FIG. 5, the first system 510 may comprise a personal digital assistant ("PDA") 515 initially providing music to a user through a headset 520 communicatively coupled to the PDA 515 through a communication link 525, which may be a tethered or non-tethered link. The user may, for example, have requested at step 210 that the first system 510 provide music to the user from a song play list, which represents a portion of a store of music information local to the PDA 515. It is to be stressed at this time that the following discussion will often refer to the exemplary first system 510 shown in FIG. 5 as an exemplary illustration of various aspects of the present invention that are in fact of much broader scope than aspects of the exemplary first system 510. Accordingly, by no means is the scope of various aspects of the present invention to be limited by characteristics of the exemplary first system 510 shown in FIG. 5.

Referring back to FIG. 2, the method 200, at step 230, comprises determining whether a second system is accessible in the dynamic wireless communication network. Such a determination may be made, for example, utilizing various "hello," "advertising" or "beacon" protocols that wireless systems may utilize to maintain their networks. Systems of a dynamic network may utilize a variety of methods to detect the presence and availability of other systems. For example, the first system may, at step 230, periodically transmit a "hello" message or listen for "hello" messages from other systems to determine the presence or availability of a second system. Accordingly, the scope of various aspects of the present invention should not be limited by characteristics of a particular method, standard or protocol for detecting the presence or availability of a system.

If step 230 determines that there is not a second system accessible to the first system, then the flow of the method 200 may return to step 220, where the first system may continue to deliver the current service to the user. Alternatively, if step 230 determines that there is a second system accessible to the first system, then the flow of the method 200 may proceed to step 240. Note that step 230 may, for example, be initiated automatically (e.g., without real-time user interaction) or may be initiated by request (e.g., by a user requesting a higher quality service).

For example and without limitation, refer to the exemplary first system 510 shown in FIG. 5. The user and the first system 510 may be mobile and may move within the boundaries of a wireless communication network of which the second system 550 is a member. The first 510 and/or second 550 systems may, for example, periodically transmit an "advertisement" message. For example, in an exemplary scenario, the second system 550 may transmit a periodic "advertisement" message, for which the first system 510 automatically listens. The first system 510 may move within range to hear the "advertisement" message and respond to the second system 550. Alternatively, for example, the user may interact with the PDA 515 to request that the PDA 515 of the first system 510 attempt to improve the quality of service currently being provided to the user.

Referring back to FIG. 2, the method 200, at step 240, may comprise the first system establishing a wireless communication link with the second system. Such a communication link may be based on any of a variety of wireless communication protocols and standards. For example, the first system may establish a communication link with the second system based on standards, such as IEEE 802.11, 802.15, UWB, Bluetooth, or other standard or proprietary protocols. Such a communication link may also, for example, include aspects of USB and Ethernet communication links. Accordingly, the scope of various aspects of the present invention should not be limited by characteristics of a particular communication protocol or method.

Referring to the exemplary first system 510 of FIG. 5, the PDA 515 of the first system 510 may, for example, establish a communication link 551 with the second system 550 based on IEEE 802.11.

Referring back to FIG. 2, the method 200, at step 250, may comprise the first system determining (e.g., determining directly through its own computations, or by receiving an indication from another system) whether utilizing the second system (or various resources thereof) will increase the quality at which the current service is being provided to the user. The first system may, for example, communicate a variety of information with the second system over a communication link established at step 240 to make such a determination. Generally, the quality determination may involve any of a large variety of quality metrics (e.g., audio/video output quality, rate of response to user input, duration over which the service may be provided, number of information consumption options available to a user, variety of information that may be accessed, quality of information that may be accessed, rate at which such information may be accessed, etc.). Accordingly, the scope of various aspects of the present invention should not be limited by characteristics of one or more particular service quality metrics.

The determination at step 250 may, for example, include determining an indication of the current quality level at which the first system is currently providing the current service to the user. Such current quality level may, for example, be compared to the expected quality level at which the current service may be provided to the user by utilizing various resources of the second system.

In the exemplary scenario 500 illustrated in FIG. 5, the PDA 515 may, for example, be communicating audio information to the headset 520 over the communication link 525. The current service (e.g., the communication of audio information to the user) may, for example, occur utilizing audio information obtained from 64 Kbps MP3 encoded information residing on the PDA 515. The first system 510 (directly or indirectly) may determine the current quality level of the audio information being provided to the user.

Referring back to FIG. 2, step 250 may comprise the first system communicating quality of service information with the second system. Such quality of service information may take any of a variety of forms. For example and without limitation, the quality of service information may include information of the quality of the current service being provided to the user by the first system or the potential quality at which the current service may be provided to the user by utilizing various resources of the second system.

Step 250 may comprise communicating information with the second system of whether the first or second system has processing capability, which if utilized, would result in the current service being provided to the user at a higher level of quality than the current quality level. For example and without limitation, the first system may communicate information of data decoding and processing capability with the second system. Such processing capability may be, for example, related to available hardware or software resources. The first system may, for example, communicate with the second system information of various computer applications that the first and second systems may execute. Such computer applications may, for example, comprise audio processing applications, video processing applications, text processing applications, numerical processing applications, email processing applications, etc.

Referring to FIG. 5, as an example, the PDA 515 may communicate with the desktop computing station 555 information of audio decoding capability. For example, the PDA 515 may communicate with the desktop computing system 555 information indicating that the desktop computing system 555 has the processing capability to decode and provide audio information to the PDA 515.

Referring back to FIG. 2, step 250 may, for example, comprise the first system communicating information of communication capability with the second system. The first system may, for example, utilize such information to determine whether utilizing various resources of the second system will result in the current service being provided to the user at a higher quality level than the current quality level. For example, providing the current service to the user at a higher quality level than the current quality level may require a communication channel between the first and second system to have a minimum communication bandwidth. Also, for example, providing the current service to the user at a higher quality level than the current quality level may require a communication channel to have a particular level of reliability. Further, for example, providing the current service to the user at a higher quality level than the current quality level may require communication utilizing a particular set of communication protocols.

Referring to the exemplary scenario 500 illustrated in FIG. 5, the PDA 515 may communicate information of communication capability with the desktop computing system 555. For example, the PDA 515 may communicate with the desktop computing system 555 information of the type of communication links that may be established between the first system 510 and the second system 550. Such communication capability information may, for example, comprise information of audio information streaming capability.

Referring back to FIG. 2, the communication capability information may also, for example, comprise information of secure communication capability. For example, in a particular scenario, the user, or one of the first and second systems, may require that communication with and between the systems be conducted securely (e.g., utilizing at least a certain level of encryption). Such secure communication capability may then be considered when determining whether various resources of the second system may be utilized to provide the current service to the user at a higher quality level than the current quality level.

In general, step 250 may comprise the first system communicating information of communication capability with the second system and utilizing such information to determine (directly or indirectly) whether utilizing various resources of the second system will provide the current service to the user at a higher level of quality than the current level of quality. Such information of communication capability may include any of a large variety of communication characteristics. Accordingly, the scope of various aspects of the present invention should not be limited by particular communication or communication link characteristics.

Step 250 may, for example, comprise the first system communicating information with the second system regarding information sources to which at least one of the first and second systems has access. For example, the second system may have access to higher quality information than the first system. As an example, such higher quality information may include information encoded utilizing a lower loss or lossless encoding technique than used to encode the information to which the first system has access. As another example, such higher quality information may include information to which the second system has access and to which the first system has no access.

The information regarding access to various information sources may also include information of the media over which such access exists. For example, access to various information sources may comprise local access or networked access. The type of access to various information sources, as well as the quality of the information, may be considered in determining whether utilizing various resources of the second system will provide the current service to the user at a higher quality level. For example and without limitation, access to high quality information over a communication network may be of little value if the network is slow or unreliable.

In general, step 250 may comprise the first system determining (directly or indirectly), based at least in part on the source information, whether utilizing various resources of the second system will result in the current service being provided to the user at a higher quality level than the current quality level. Accordingly, the scope of various aspects of the present invention should not be limited by characteristics of particular information, information sources, or particular links to such information sources.

Referring to the exemplary scenario 500 illustrated in FIG. 5, the PDA 515 may have access to a local memory device having MP3 audio information encoded at 64 Kbps encoding, while the desktop computing system 555 may have access to CD-quality music information stored in a local memory device 560 or through a network 565. The first 510 or second 550 systems may consider such information access when determining whether utilizing resources of the second system 550 will provide the current service to the user at a higher level of quality.

Referring back to FIG. 2, step 250 may comprise the first system communicating access control information with the second system. Such access control information may, for example, comprise digital certificate, certificate authority (CA) key, management/access control, CA verification, and various user/system identification information.

The first system may, for example, utilize such information to determine whether various resources of the second system may be utilized to provide the current service to the user at a higher quality level. For example, the user or the first system may require that the second system be authorized to provide access to various resources for use in providing the current service to the user. Such authorization may, for example, be system, service or user dependent.

In general, step 250 may comprise the first system communicating access control information with the second system and utilizing such information to determine whether various resources of the second system may be utilized to provide the current service to the user. Accordingly, the scope of various aspects of the present invention should not be limited by characteristics of particular access control requirements, strategies or implementations.

Referring to the exemplary scenario 500 illustrated in FIG. 5, the first system 510 may, for example, have a list of systems and/or resources of other systems that the first system 510 will allow to be utilized to provide the current service to the user. If the second system 550 is not an authorized system, then the first system 510 may determine that various resources of the second system 550 are not available for providing the current service to the user.

In general, step 250 comprises the first system determining whether utilizing various resources of the second system will increase the quality at which the current service is being provided to the user. As mentioned previously, such a determination may, for example, include analyzing information related to processing capability, communication capability (including secure communication capability), information access, and access control. The information that step 250 may analyze to determine whether utilizing various resources of the second system will provide the current service to the user at a higher quality level is by no means limited to the previous example. Accordingly, the scope of various aspects of the present invention should not be limited by characteristics of particular information that may be considered in making such a determination.

The method 200, at step 260, may comprise the first system determining whether to utilize various resources of the second system to provide the current service to the user, based at least in part on the determination made at step 250. For example, if the first system, in step 250, determined that utilizing various resources of the second system is not allowed or not possible, then step 260 may direct the flow of the method 200 to step 270, in which the first system may, for example, continue providing the current service to the user at the current quality level. Also for example, if the first system, at step 250, determined that utilizing various resources of the second system would not result in the current service being provided to the user at a higher quality level, then step 260 may direct the flow of the method 200 to step 280.

Referring to FIG. 5, in the exemplary scenario 500, the first system 510 (directly or indirectly) may determine that utilizing an information resource of the second system 550 (e.g., the local storage device 560 or network access 565) and desktop computer 555 audio decoding capability will provide the current service (e.g., music) to the user at a higher level of quality than is currently being provided to the user.

Referring back to FIG. 2, the method 200, at step 280, may comprise the first system requesting and/or receiving an allocation of various resources of the second system for providing the current service to the user at a higher level of quality than the current level of quality. Alternatively, the first system may control the allocation of the resources of the second system. However, for this example, the first system is receiving the allocation of resources from another system (e.g., from the second system). Note that such allocation may or may not, depending on the nature of the allocated resource, impact the availability of the allocated resource for utilization with other systems.

Referring to the exemplary scenario 500 of FIG. 5, the PDA 515 of the first system 510 may receive an allocation of resources from the desktop computing system 555. Such allocated resources may comprise, for example, audio data storage resources, audio information processing resources and audio information communication resources for use in providing the current service to the user at a higher quality level. In addition to resource allocation information, the PDA 515 may receive from the desktop computing system 555 information related to the effective utilization of such allocated resources to provide the current service to the user.

Referring back to FIG. 2, the method 200, at step 290, generally follows the resource allocation of step 280 with utilization of such resources of the second system to provide the current service to the user at a higher quality level. Such utilization may be accomplished in a variety of manners depending on the particular system configuration and allocated resources.

For example, various communication links may be established between the first and second systems. The first and second systems may, for example, utilize such communication links to communicate a variety of information depending on the service being provided and the system configuration. For example, the first system may receive raw data from the second system for further processing, or the first system may receive processed data from the second system for immediate presentation to the user. Alternatively, for example, the first system may direct the second system to provide processed information directly to the user through a user interface device.

Such resource utilization may comprise a variety of processing activities on the part of the first system. For example and without limitation, the first system may provide information to the allocated resources of the second system for processing. For example, the first system may direct the allocated resources of the second system to acquire information from a source other than the first system and process such information. Also for example, the first system may receive information from the allocated resources of the second system on which the first system is to perform further processing.

Referring to the exemplary scenario 500 shown in FIG. 5, the PDA 515 may receive raw or processed audio information over the communication link 551 from the desktop computing system 555. The desktop computing system 555 may have obtained such audio information from local storage 560 or the network 565. Alternatively, for example, the first system 510 may establish a direct communication link 552 between the headset 520 and the desktop computing system 555. The PDA 515 may alternatively, for example, direct the desktop computing system 555 to provide audio output through an audio output device 570 coupled to the desktop computing system 555, if the PDA 515 determines that such action would increase the level of quality at which the current service is being provided to the user.

Referring back to FIG. 2, step 290 may, for example, comprise the first system communicating control information with the second system. For example, the user may utilize the first system to control the utilization of resources of the second system. Alternatively, for example, the user may utilize resources of the second system (e.g., keyboard, mouse and display resources) to control the utilization of the allocated resources of the second system. In such a scenario, the first system may receive control information from the second system that the first system may utilize to control its own behavior.

Referring to the exemplary scenario 500 shown in FIG. 5, a user may, for example, use various U/I devices to control the manner in which the current service is being provided to the user. For example, the user may utilize the display 516 and input 517 of the PDA 515 to control the manner in which the current service is being delivered to the user. Alternatively, for example, the user may utilize the display 580, keyboard 581 and mouse 582 resources of the second system 550 to control the manner in which the current service is being delivered to the user. In such a scenario, PDA 515 may, for example, receive control information from the desktop computing system 555 over the wireless communication link 551.

In general, step 290 comprises utilizing the allocated resources of the second system to provide the current service to the user at a higher level of quality than the current quality level. Accordingly, the scope of various aspects of the present invention should not be limited by characteristics of particular information obtaining, distributed processing or communication scenarios.

Various aspects of the methods 100, 200 illustrated in FIGS. 1-2 may be performed by either of the first and second systems, and alternatively a third system. Accordingly, the scope of various aspects of the present invention should not be limited to which particular system may be performing the various aspects of the methods 100, 200. As an example, refer to FIG. 3 for an exemplary method 300 that may be performed in a second system of a dynamic communication network. The fact that the second system may perform the various aspects of the method 300 illustrated in FIG. 3 and discussed below is not to be taken as an indication that the second system is required to perform any or all of such various aspects.

Figure 3:
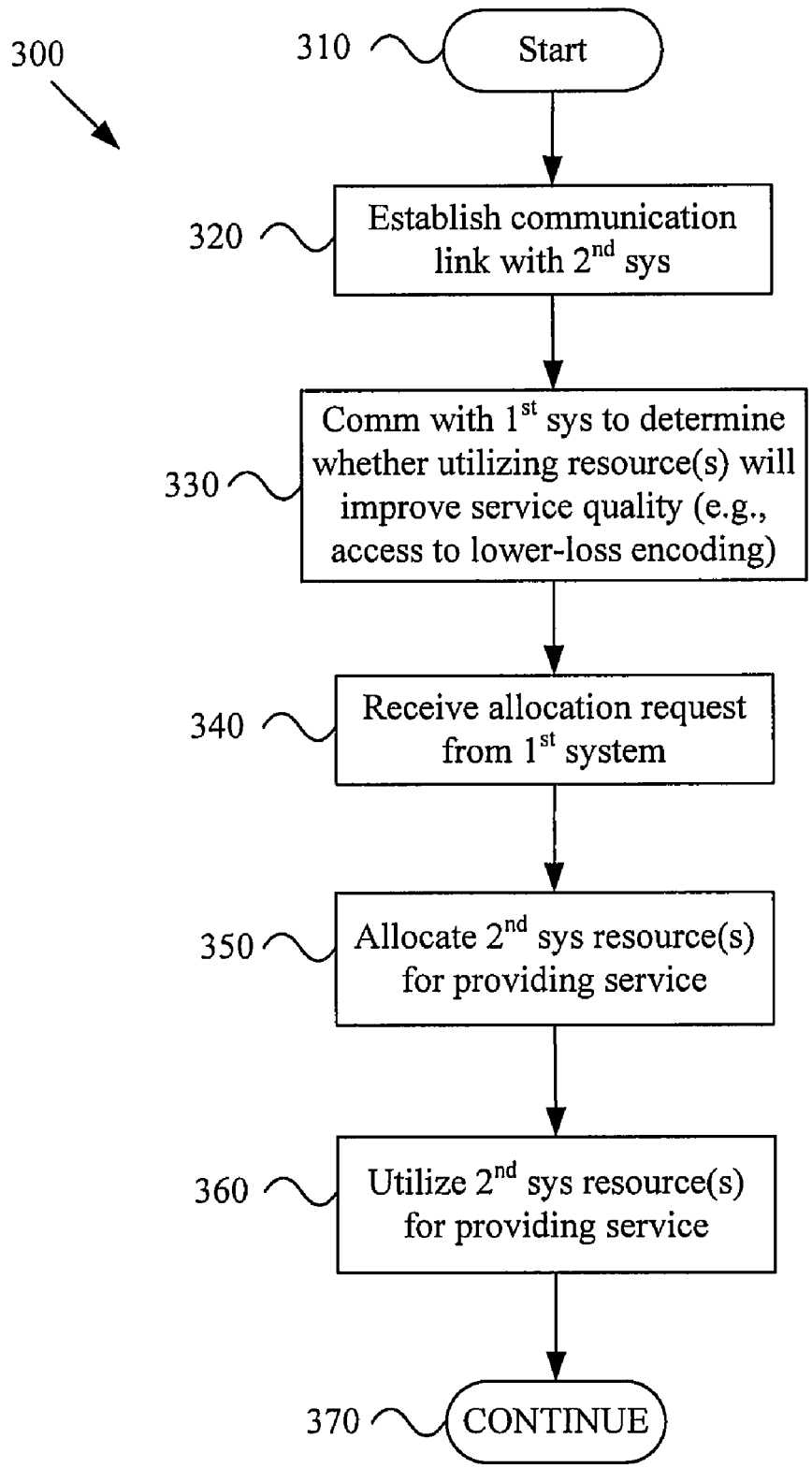
FIG. 3 is a flow diagram illustrating a method in a second system for quality of service based resource allocation and utilization in a dynamic wireless network environment, in accordance with various aspects of the present invention.

FIG. 3 is a flow diagram illustrating a method 300 in a second system for quality of service based resource allocation and utilization in a dynamic wireless network environment, in accordance with various aspects of the present invention. The method 300 begins at step 310. Various events and conditions may cause the method 300 to begin. For example, a user may request that a first system in a wireless communication network of the second system provide a current service to the user. Alternatively, for example, a user may be utilizing a first system to provide a current service to the user when the first system moves within range of a wireless communication network of the second system.

The second system may, for example, detect the first system being within the boundaries of the wireless communication network (e.g., by receiving a beacon signal from the first system). Alternatively, for example the first system may send a signal to the second system in response to the first system receiving a beacon signal from the second system. In general, a variety of conditions may trigger the beginning of the method 300, and accordingly, the scope of various aspects of the present invention should not be limited by characteristics of a particular triggering event for the method 300.

The method 300, at step 320, may comprise the second system establishing a wireless communication link with the first system. Such a communication link may be based on any of a variety of wireless communication protocols and standards. For example, the first system and second system may establish a communication link based on standards, such as IEEE 802.11, 802.15, UWB, Bluetooth, or other standard or proprietary protocols. Such a communication link may also, for example, include aspects of USB and Ethernet communication links. Accordingly, the scope of various aspects of the present invention should not be limited by characteristics of a particular communication protocol or method.

Referring to the exemplary scenario 500 of FIG. 5, the exemplary second system 550 may, for example, establish a wireless communication link 551 with the first system 510 based on IEEE 802.11.

Referring back to FIG. 3, the method 300, at step 330, may comprise the second system communicating with the first system to determine whether utilizing resources of the second system will increase the quality at which the current service is being provided to the user. The second system may, for example, communicate a variety of information with the first system over the communication link established at step 320 to make such a determination. In various aspects of the present invention, the first system or second system may make the ultimate determination as to whether utilizing resources of the second system will increase the level of quality at which the current service is being provided to the user. The following discussion will focus generally on the first system making such ultimate determination. However, by no means is the scope of various aspects of the present invention to be limited to characteristics of the second system making the ultimate determination.

Generally, quality determination may involve any of a large variety of quality metrics (e.g., audio/video output quality, rate of response to user input, duration over which the service may be provided, number of information consumption options available to a user, variety of information that may be accessed, quality of information that may be accessed, rate at which such information may be accessed, etc.). Accordingly, the scope of various aspects of the present invention should not be limited by characteristics of one or more particular service quality metrics.

Step 330 may, for example, comprise the second system communicating quality of service information with the first system. Such quality of service information may take any of a variety of forms. For example and without limitation, the quality of service information may include information of the potential quality at which the current service may be provided to the user by utilizing various resources of the second system.

Step 330 may, for example, comprise the second system communicating information with the first system of whether the first or second system has processing capability, which if utilized, would result in the current service being provided to the user at a higher level of quality than the current quality level. For example and without limitation, the second system may communicate with the first system information of data decoding and processing capability of the second system. Such processing capability may be, for example, related to available hardware or software resources. The second system may, for example, communicate with the first system information of various computer applications that the first and second systems may execute. Such computer applications may, for example, comprise audio processing applications, video processing applications, text processing applications, numerical processing applications, etc.

Referring to FIG. 5, as an example, the desktop computing station 555 may communicate with the PDA 515 information of audio decoding capability. For example, the desktop computing system 555 may communicate information with the PDA 515 indicating that the desktop computing system 555 has the processing capability to decode and provide audio information to the PDA 515.

Referring back to FIG. 3, step 330 may, for example, comprise the second system communicating with the first system information of communication capability. The first system may, for example, utilize such information to determine whether utilizing various resources of the second system will result in the current service being provided to the user at a higher quality level than the current quality level. For example, providing the current service to the user at a higher quality level than the current quality level may require a communication channel between the second and first systems to have a minimum communication bandwidth. Also, for example, providing the current service to the user at a higher quality level than the current quality level may require a communication channel to have a particular level of reliability. Further, for example, providing the current service to the user at a higher quality level than the current quality level may require communication utilizing a particular set of communication protocols.

Referring to the exemplary scenario 500 illustrated in FIG. 5, the desktop computing system 555 may communicate with the PDA 515 information of communication capability. For example, the desktop computing system 555 and the PDA 515 may communicate information of the type of communication links that may be established between the first system 510 and the second system 550. Such communication capability information may, in the exemplary scenario 500, comprise information of audio information streaming capability.

Referring back to FIG. 3, the communication capability information may also, for example, comprise information of secure communication capability. For example, in a particular scenario, the user or one of the first and second systems may require that communication between the systems, or from one of the systems to a user interface device, be conducted securely (e.g., utilizing at least a certain level of encryption). Such secure communication capability may then be considered when determining whether various resources of the second system may be utilized to provide the current service to the user at a higher quality level than the current quality level.

In general, various aspects of step 330 may comprise communicating information of communication capability, where such information may be utilized to determine whether utilizing various resources of the second system will provide the current service to the user at a higher level of quality than the current level of quality. Such information of communication capability may include any of a large variety of communication characteristics. Accordingly, the scope of various aspects of the present invention should not be limited by particular communication or communication link characteristics.

Step 330 may, for example, comprise the second system communicating information with the first system regarding information sources to which at least one of the first and second systems have access. For example, the second system may have access to higher quality information than the first system. As an example, such higher quality information may include information encoded utilizing a lower loss encoding technique than used to encode the information to which the first system has access. As another example, such higher quality information may include information to which the second system has access and to which the first system has no access.

The information regarding access to various information sources may also include information of the media over which such access exists. For example, access to various information sources may comprise local access or networked access. The type of access to various information sources, as well as the quality of the information, may be considered in determining whether utilizing various resources of the second system will provide the current service to the user at a higher quality level. For example and without limitation, access to high quality information over a communication network may be of little value if the network is slow or unreliable.

In general, various aspects of step 330 may comprise the second system and first system communicating information related to access to sources of information, where such information may be analyzed to determine whether utilizing various resources of the second system will result in the current service being provided to the user at a higher quality level than the current quality level. Accordingly, the scope of various aspects of the present invention should not be limited by characteristics of particular information, information sources, or particular links to such information sources.

Referring to the exemplary scenario 500 illustrated in FIG. 5, the PDA 515 may have access to a local memory device having MP3 audio information encoded at 64 Kbps encoding, while the desktop computing system 555 may have access to CD-quality music information stored in a local memory device 560 or through a network 565. The second system 550 may, for example, communicate to the first system 510 information related to the second system 550 having access to CD-quality music, which the first system 510 may consider when determining whether utilizing resources of the second system 550 will provide the current service to the user at a higher level of quality.

Referring back to FIG. 3, step 330 may, for example, comprise the second system communicating access control information with the first system. Such access control information may, for example, comprise digital certificate, certificate authority (CA) key, management/access control, CA verification information, and a variety of user/system identification information.

The first and/or second system may utilize such information to determine whether various resources of the second system may be utilized to provide the current service to the user at a higher quality level. For example, the second system may require the first system (or a user thereof) to be authorized to utilize various resources of the second system. Also, for example, the user or the first system may require that the second system be authorized to provide access to various resources for use in providing the current service to the user. Such authorization may, for example, be system, service or user dependent.

In general, step 330 may, for example, comprise the second system communicating access control information with the first system, where such information may be analyzed to determine whether various resources of the second system may be utilized to provide the current service to the user. Accordingly, the scope of various aspects of the present invention should not be limited by characteristics of particular authorization requirements, strategies or implementations.

Referring to the exemplary scenario 500 illustrated in FIG. 5, the second system 550 may, for example, have a list of users or systems to which the second system 550 may allocate resources. If the user of the first system 510 is not an authorized user, the second system (or alternatively, the first 510 system) may determine that various resources of the second system 550 are not available for providing the current service to the user.

In general, step 330 comprises the second system communicating information with the first system to determine whether utilizing various resources of the second system will increase the quality at which the current service is being provided to the user. As mentioned previously, such a determination may, for example, include communicating and analyzing information related to processing capability, communication capability (including secure communication capability), information access, and access control. The information that may be communicated and analyzed in step 330 to determine whether utilizing various resources of the second system will provide the current service to the user at a higher quality level is by no means limited to the previous examples. Accordingly, the scope of various aspects of the present invention should not be limited by characteristics of particular information that may be considered in making such a determination.

The method 300, at step 340, may comprise the second system receiving a request (e.g., from the first system) for allocation of one or more resources of the second system for providing the current service to the user. In an alternative example, step 340 may comprise the second system communicating a message to the first system offering an allocation of one or more resources of the second system for providing the current service to the user.

Referring to FIG. 5, in the exemplary scenario 500, the first system 510 may, for example, determine that utilizing an information resource (e.g., the local storage device 560 or network access 565) and desktop computer 555 audio decoding capability of the second system 550 will provide the current service (e.g., music) to the user at a higher level of quality than is currently being provided to the user. The first system 510 may then, for example, communicate a request to the second system 550 for allocation of the resources for providing the current service to the user.

Referring back to FIG. 3, the method 300, at step 350, may comprise the second system allocating various resources of the second system for providing the current service to the user at a higher level of quality than the current level of quality. Note that such allocation may or may not, depending on the nature of the allocated resource, impact the availability of the allocated resource for utilization with other systems. The first and second systems may, for example, communicate resource allocation information in preparation for utilizing the allocated resources to provide the current service to the user at a higher quality level.

Referring to the exemplary scenario 500 and scenario of FIG. 5, the desktop computing system 555 of the second system 550 may, for example, allocate a portion of information access resources, audio information processing resources, and audio information communication resources for use in providing the current service to the user at a higher quality level. The desktop computing system 555 may communicate information of such allocation to the PDA 515, along with information related to the effective utilization of such allocated resources to provide the current service to the user.

Referring back to FIG. 3, the method 300, at step 360, generally follows the resource allocation of step 350 with utilizing the allocated resources of the second system to provide the current service to the user at a higher quality level. Such utilization may be accomplished in a variety of manners depending on the particular system configuration and allocated resources.

For example, the second system may establish various communication links with the first system. The second system may, for example, utilize such communication links to communicate a variety of information with the first system depending on the service being provided and the system configuration. For example, the second system may provide raw data to the first system for further processing, or the second system may provide processed data to the first system for immediate presentation to the user. Alternatively, for example, the second system may provide processed information directly to the user through a user interface device.

Such resource utilization may comprise a variety of processing activities on the part of the second system and/or first system. For example and without limitation, the allocated resources of the second system may process information provided by the first system. For example, the allocated resources of the second system may acquire information from a source other than the first system and process such acquired information. Also for example, the allocated resources of the second system may acquire information from a source other than the first system and pass such information to the first system for processing.

Referring to the exemplary scenario 500 shown in FIG. 5, the desktop computing system 555 may, for example, retrieve raw audio information from local storage 560 or the network 565 and process such information for delivery to the PDA 515 over the communication link 551. Alternatively, for example, the desktop computing system 555 may establish a direct communication link 552 to the headset 520 to provide music information directly to the headset 520 of the user. The desktop computing system 555 may, for example, provide audio output through an audio output device 570 coupled to the second system 555, if the first 510 and/or second 555 system determines that such action would increase the level of quality at which the current service is being provided to the user.

Referring back to FIG. 3, step 360 may, for example, comprise the second system communicating control information with the first system. For example, the user may utilize the first system to control the utilization of resources of the second system. In such a scenario, the second system may receive control information from the first system. Alternatively, for example, the user may utilize resources of the second system (e.g., keyboard, mouse and display resources) to control the utilization of the allocated resources of the second system. In such a scenario, the second system may transmit control information to the first system for the first system to utilize.

Referring to the exemplary scenario 500 shown in FIG. 5, a user may, for example, use various U/I devices to control the manner in which the current service is being provided to the user. For example, the user may utilize the display 516 and input 517 of the PDA 515 to control the manner in which the current service is being delivered to the user. Alternatively, for example, the user may utilize the display 580, keyboard 581 and mouse 582 resources of the second system 550 to control the manner in which the current service is being delivered to the user.

Referring back to FIG. 3, in general, step 360 comprises utilizing the allocated resources of the second system to provide the current service to the user at a higher level of quality than the current quality level. Accordingly, the scope of various aspects of the present invention should not be limited by characteristics of particular information obtaining, processing or communication scenarios.

Figure 4:
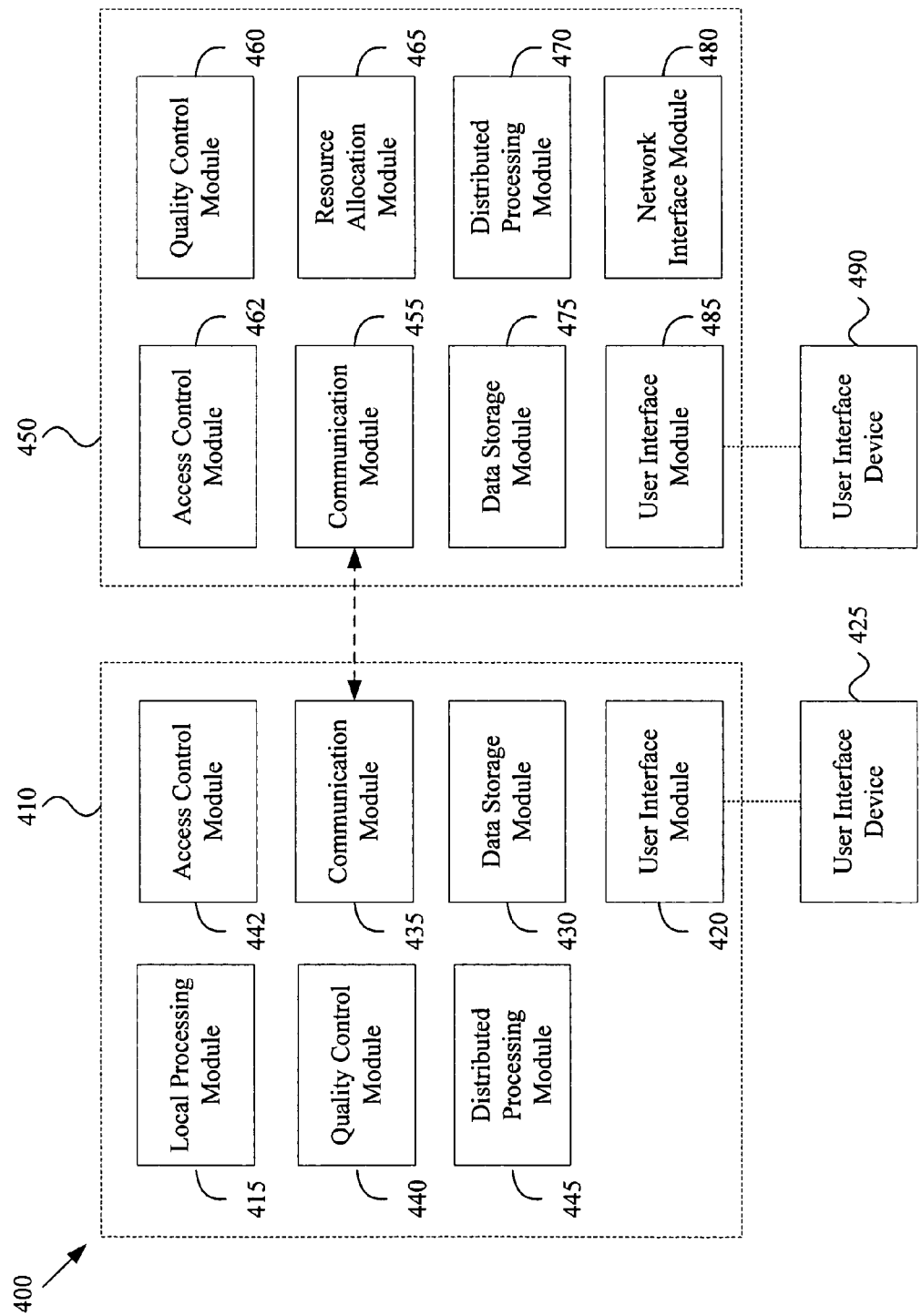
FIG. 4 is a diagram showing a system that implements quality of service based resource allocation and utilization in a dynamic wireless network environment, in accordance with various aspects of the present invention.

FIG. 4 is a diagram showing a system 400 that implements quality of service based resource allocation and utilization in a dynamic wireless network environment, in accordance with various aspects of the present invention. The system 400 includes a first system 410 and a second system 450. The first system 400 may comprise a local processing module 415, user interface module 420 coupled to a user interface device 425, data storage module 430, communication module 435, quality control module 440, access control module 442 and a distributed processing module 445. The second system 450 may comprise a communication module 455, quality control module 460, access control module 462, resource allocation module 465, distributed processing module 470, data storage module 475, and user interface module 485 coupled to a user interface device 490.

The first system 410 may, for example, utilize the local processing module 415 to provide a current service to a user. The local processing module 415 may, for example, utilize the user interface module 420 to provide service information to a user through the user interface device 425. As mentioned previously, a "service" is generally a function performed by the first system for the ultimate benefit of the user. For example and without limitation, a service may comprise an audio output service, a video output service, a textual interface service, an audio interface service, a video interface service, a data processing service, an email service, etc. Accordingly, the scope of various aspects of the present invention should not be limited by characteristics of a particular provided service.

The first system 410 may comprise a communication module 435 that establishes a wireless communication link with a corresponding communication module 455 of the second system 450. The communication module 435 may, for example, determine whether a second system is accessible in a dynamic wireless communication network. The communication module 435 may, for example, utilize various "hello," "advertising" and "beacon" protocols that dynamic wireless systems may utilize to maintain their networks. The communication module 435 may, for example, utilize a variety of methods to detect the presence and availability of other systems. Accordingly, the scope of various aspects of the present invention should not be limited by characteristics of a particular method, standard or protocol for detecting the presence or availability of a system.

The communication module 435 may establish a wireless communication link based on any of a variety of wireless communication protocols and standards. For example, the communication module 435 of the first system 410 and the communication module 455 of the second system may establish a communication link based on standards, such as IEEE 802.11, 802.15, UWB, Bluetooth, or other standard or proprietary protocols. Such a communication link may also, for example, include aspects of USB and Ethernet communication links. Accordingly, the scope of various aspects of the present invention should not be limited by characteristics of a particular communication protocol or method.

The first system 410 may comprise a quality control module 440, and the second system 450 may comprise a quality control module 460. It should be noted that though the following discussion may at times refer to one or both of the particular quality control modules 440, 460 performing particular processing, such processing may readily be shared and distributed between the quality control modules 440, 460.

The quality control modules 440, 460 may, for example, be communicatively coupled to respective communication modules 435, 455, which the quality control modules 440, 460 may utilize to communicate with each other over a wireless communication link. One or both of the quality control modules 440, 460 may determine whether utilizing the second system 450 (or various resources thereof) will increase the quality at which the current service is being provided to the user.

The quality control modules 440, 460 may, for example, communicate a variety of information over the communication link established between the communication modules 435, 455 make such a determination. Generally, the quality determination may involve any of a large variety of quality metrics (e.g., audio/video output quality, rate of response to user input, duration over which the service may be provided, number of information consumption options available to a user, variety of information that may be accessed, quality of information that may be accessed, rate at which such information may be accessed, etc.). Accordingly, the scope of various aspects of the present invention should not be limited by characteristics of one or more particular service quality metrics.

The quality control modules 440, 460 may, for example, determine the current quality level at which the first system 410 is providing the current service to the user. One or both of the quality control modules 440, 460 may, for example, utilize such current quality level to compare with the expected quality at which the current service may be provided to the user by utilizing various resources of the second system 450.

For example, the quality control modules 440, 460 may communicate quality of service information with each other. Such quality of service information may take any of a variety of forms. For example and without limitation, the quality of service information may include information of the quality of the current service being provided to the user by the first system 410 or the potential quality at which the current service may be provided to the user by utilizing various resources of the second system 450.

The quality control modules 440, 460 may, for example, communicate information of whether the first 410 or second 450 system has processing capability, which if utilized, would result in the current service being provided to the user at a higher level of quality than the current quality level. For example and without limitation, the quality control modules 440, 460 may communicate information of data decoding and processing capability. Such processing capability may, for example, be related to available hardware or software processing resources. The quality control modules 440, 460 may, for example, communicate information of various computer applications that the first 410 and second 450 systems may execute. Such computer applications may, for example, comprise audio processing applications, video processing applications, text processing applications, numerical processing applications, email processing applications, etc.

The quality control modules 440, 460 may, for example, communicate information of communication capability. The quality control modules 440, 460 may, for example, utilize such information to determine whether utilizing various resources of the second system will result in the current service being provided to the user at a higher quality level than the current quality level. For example, providing the current service to the user at a higher quality level than the current quality level may require a communication channel between the communication modules 435, 455 to have a minimum communication bandwidth. Also, for example, providing the current service to the user at a higher quality level than the current quality level may require a communication channel between the communication modules 435, 455 to have a particular level of reliability. Further, for example, providing the current service to the user at a higher quality level than the current quality level may require that the communication modules 435, 455 (or processing modules utilizing such communication modules) communicate utilizing a particular set of communication protocols.

The quality control modules 440, 460 may, for example, communication information of secure communication capability. For example, in a particular scenario, the user or one of the first 410 and second 450 systems may require that communication between the systems, or between one of the systems and a user interface device, be conducted securely (e.g., utilizing at least a certain level of encryption). Such secure communication capability may then be considered when determining whether various resources of the second system 450 may be utilized to provide the current service to the user at a higher quality level than the current quality level.

In general, the quality control modules 440, 460 may communicate information of communication capability and utilize such information to determine whether utilizing various resources of the second system 450 will provide the current service to the user at a higher level of quality than the current level of quality. Such information of communication capability may include any of a large variety of communication characteristics. Accordingly, the scope of various aspects of the present invention should not be limited by particular communication or communication link characteristics.

The quality control modules 440, 460 may, for example, communicate information regarding information sources to which at least one of the first 410 and second 450 systems have access. For example, the second system 450 may have access to higher quality information than the first system 410. As an example, such higher quality information may include information encoded utilizing a lower loss encoding technique than used to encode the information to which the first system 410 has access. As another example, such higher quality information may include information to which the second system 450 has access and to which the first system has no access 410.

The information regarding access to various information sources may also include information of the media over which such access exists. For example, access to various information sources may comprise local access or networked access. The second system 450, for example, may comprise a data storage module 475 for local storage of information, and may comprise a network interface module 480 through which the second system 450 may access information over a network.

The quality control modules 440, 460 may, for example, communicate and consider the type of access to various information sources, as well as the quality of the information, in determining whether utilizing various resources of the second system will provide the current service to the user at a higher quality level. For example and without limitation, access to high quality information over a network may, in a particular scenario, be of little value if the network is slow or unreliable.

In general, one or both of the quality control modules 440, 460 may determine, based at least in part on access to various information sources, whether utilizing various resources of the second system 450 will result in the current service being provided to the user at a higher quality level than the current quality level. Accordingly, the scope of various aspects of the present invention should not be limited by characteristics of particular information, information sources, or particular links to such information sources.

In general, the quality control modules 440, 460 may determine whether utilizing various resources of the second system 450 will increase the quality at which the current service is being provided to the user. As mentioned previously, such a determination may, for example, comprise communicating and/or analyzing information related to processing capability, communication capability (including secure communication capability), and information access. The information that the quality control modules 440, 460 may analyze to determine whether utilizing various resources of the second system 450 will provide the current service to the user at a higher quality level is by no means limited to the previous examples. Accordingly, the scope of various aspects of the present invention should not be limited by characteristics of particular information that may be considered in making such a determination.

The first system 410 may comprise an access control module 442, and the second system 450 may comprise an access control module 462. The access control modules 442, 462 may be communicatively coupled to respective communication modules 435, 455 of the first 410 and second 450 systems. The access control modules 442, 462 may, for example, communicate access control (e.g., authorization or authentication information). Such access control information may, for example, comprise digital certificate, certificate authority (CA) key, management/access control, CA verification, and various user or system identification or authorization information.

The access control modules 442, 462 may utilize such information to determine whether various resources of the second system 450 may be utilized to provide the current service to the user at a higher quality level. For example, the second system 450 may require the first system 410 (or a user thereof) to be authorized and/or authenticated to utilize various resources of the second system 450. Also, for example, the user or the first system 410 may require that the second system 450 be authorized and/or authenticated to provide access to various resources for use in providing the current service to the user. Such access control may, for example, be system, service or user dependent.

In general, the access control modules 442, 462 may communicate access control information and utilize such information to determine whether various resources of the second system 450 may be utilized to provide the current service to the user. Accordingly, the scope of various aspects of the present invention should not be limited by characteristics of particular access control requirements, strategies or implementations.

The second system 450 may comprise a resource allocation module 465. Alternatively, the first system 410 may also comprise a resource allocation module. Though the following discussion will focus on the second system 450 resource allocation module 465, this exemplary configuration should by no means limit the scope of various aspects of the present invention to a particular logical or physical location of a resource allocation module.

The resource allocation module 450 may, for example, allocate various resources of the second system 450 for providing the current service to the user at a higher level of quality than the current level of quality. Note that such allocation may or may not, depending on the nature of the allocated resource, impact the availability of the allocated resource for utilization with other systems. The resource allocation module 450 may, for example, communicate resource allocation information to respective distributed processing 445, 470 of the first 410 and second 450 systems.

The resource allocation module 465 may, for example, allocate various resources of the second system 450 based on information obtained from the quality control modules 440, 460 and/or the access control modules 442, 462. For example, if one or both of the quality control modules 440, 460 indicate that utilization of a resource of the second system 450 will provide the current service to the user at a higher level of quality; one or both of the access control modules 442, 462 indicate that such resource use is authorized; and the desired resource of the second system 450 is available for use, then the resource allocation module 465 may, for example, allocate the resource for use in providing the current service to the user.

The first 410 and second 450 systems may comprise respective distributed processing modules 445, 470. The distributed processing modules 445, 470 may generally manage the utilization of allocated resources of the second system 450 to provide the current service to the user. The distributed processing modules 445, 470 may provide for such resource utilization in a variety of manners depending on the particular system configuration and the specific allocated resources.

For example, distributed processing modules 445, 470 may, for example, utilize respective communication modules 435, 455 to establish various communication links between the first 410 and second 450 systems. The distributed processing modules 445, 470 may, for example, utilize such communication links to communicate a variety of information depending on the service being provided and the system configuration. For example, the distributed processing module 470 of the second system 450 may provide raw data to the first system 410 (e.g., to the distributed processing module 445 of the first system 410) for further processing, or the distributed processing module 470 of the second system 450 may provide processed data to the distributed processing module 445 of the first system 410 for immediate presentation to the user. Alternatively, for example, the distributed processing module 470 of the second system 450 may provide processed information directly to the user by utilizing the user interface module 485 of the second system 450.

Such resource utilization may comprise a variety of processing activities on the part of the first 410 and/or second 450 systems. For example and without limitation, the allocated resources of the second system 450 may process information provided by the first system 410. For example, the allocated resources of the second system 450 may acquire information from a source other than the first system 410 and process such information. Also for example, the allocated resources of the second system 450 may acquire information from a source other than the first system 410 and pass such information to the first system 410 for further processing.

The distributed processing modules 445, 470 may, for example, communicate service control information. For example, the user may utilize the user interface device 425 and user interface module 420 of the first system 410 to control how the current service is provided to the user. Alternatively, for example, the user may utilize the user interface device 490 and user interface module 485 of the second system 450 to control how the current service is provided to the user. The distributed processing modules 445, 470 may receive such control information from the user and modify the utilization of the allocated resources of the second system 450 accordingly.

In general, one or both of the distributed processing modules 445, 470 manage utilization of the allocated resources of the second system 450 to provide the current service to the user. Accordingly, the scope of various aspects of the present invention should not be limited by characteristics of particular information obtaining, distributed processing or communication scenarios.

The various systems and modules illustrated in FIG. 4 may, for example, be implemented in hardware or software. For example, various modules may be integrated into a single integrated circuit. Also, for example, various modules may be implemented in software applications or operating system functionality. Accordingly, the scope of various aspects of the present invention should by no means be limited to particular hardware or software implementations of the various modules and components discussed previously.

In summary, aspects of the present invention provide a system and method for quality-of-service based network resource allocation and utilization in a dynamic wireless network environment. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a wireless communication network that comprises a first portable system providing a current information output service at a current quality level to a user, a method for allocating a resource of a second system external to the first portable system to provide improved quality of service to the user, the method comprising:

establishing a wireless communication link between the first portable system and the second system;

determining whether utilizing a resource of the second system in conjunction with the first portable system will provide the current information output service to the user at a higher quality level than the current quality level, wherein said determining comprises determining whether the second system has access to information encoded using a lower loss encoding technique than used to encode information to which the first portable system has access; and if it is determined that utilizing the resource of the second system in conjunction with the first portable system will provide the current information output service to the user at a higher quality level, then allocating the resource of the second system for such utilization.

2. The method of claim 1, further comprising utilizing the allocated resource of the second system in conjunction with the first portable system to provide the current information output service to the user at a higher quality level.

3. The method of claim 2, wherein utilizing the allocated resource of the second system in conjunction with the first portable system to provide the current information output service to the user comprises utilizing the allocated resource to communicate information to the first portable system for presentation to the user, the information being based on data obtained from a storage device communicatively coupled to the second system through a computer network.

4. The method of claim 2, wherein the first portable system and the second system perform the establishing, determining, allocating and utilizing automatically, without user interaction.

5. The method of claim 2, wherein utilizing the allocated resource of the second system in conjunction with the first portable system comprises utilizing the allocated resource of the second system to communicate decoded audio information to the first portable system.

6. The method of claim 1, wherein determining whether utilizing a resource of the second system in conjunction with the first portable system will provide the current information output service to the user at a higher quality level comprises determining whether the second system has processing capability to provide the current information output service to the user at a higher quality level.

7. The method of claim 1, wherein determining whether utilizing a resource of the second system in conjunction with the first portable system will provide the current information output service to the user at a higher quality level comprises determining whether at least one of the first portable system and the second system has communication capability necessary for utilizing resources of the second system to provide the current information output service to the user at a higher quality level.

8. The method of claim 1, wherein determining whether utilizing a resource of the second system in conjunction with the first portable system will provide the current information output service to the user at a higher quality level comprises determining whether the second system has access to music information encoded using a lower loss encoding technique than used to encode music information to which the first portable system has access.

9. The method of claim 1, wherein determining whether utilizing a resource of the second system in conjunction with the first portable system will provide the current information output service to the user at a higher quality level than the current quality level comprises determining, based at least in part on information communicated between the first portable system and the second system over the wireless communication link, whether utilizing a resource of the second system in conjunction with the first portable system will provide the current information output service to the user at a higher quality level than the current quality level.

10. The method of claim 1, wherein the information output service is a music output service.

11. The method of claim 1 wherein determining whether the second system has access to information encoded using a lower loss encoding technique than used to encode information to which the first portable system has access comprises determining whether the second system has access to music information encoded using a lower loss MP3 encoding technique than used to encode the information to which the first portable system has access.

12. The method of claim 1, wherein determining whether the second system has access to higher quality information than information to which the first portable system has access comprises determining whether the second system has access to information encoded using a lower loss encoding technique than used to encode information stored at the first portable system.

13. In a first portable system in a wireless communication network, a method for obtaining allocation of a resource of a second system to provide improved quality of service to a user, the method comprising:

providing a current information output service at a current quality level to a user;

establishing a wireless communication link with a second system external to the first portable system in the wireless communication network;

determining whether utilizing a resource of the second system in conjunction with the first portable system will provide the current information output service to the user at a higher quality level than the current quality level, wherein said determining comprises determining whether the second system has access to information encoded using a lower loss encoding technique than used to encode information to which the first portable system has access; and if it is determined that utilizing the resource of the second system in conjunction with the first portable system will provide the current information output service to the user at a higher quality level than the current quality level, then requesting allocation of the resource of the second system for such utilization.

14. The method of claim 13, further comprising utilizing the resource of the second system in conjunction with the first portable system to provide the current information output service to the user at a higher quality level than the current quality level.

15. The method of claim 14, wherein utilizing the resource of the second system in conjunction with the first portable system to provide the current information output service to the user comprises receiving information from the resource of the second system that is based on data that the resource of the second system obtained from a storage device communicatively coupled to the resource of the second system through a computer network.

16. The method of claim 14, wherein the first portable system performs the establishing, determining, requesting and utilizing automatically, without user interaction.

17. The method of claim 14, wherein utilizing the resource of the second system in conjunction with the first portable system to provide the current information output service to the user comprises receiving decoded audio information from the resource of the second system.

18. The method of claim 13, wherein determining whether utilizing a resource of the second system in conjunction with the first portable system will provide the current information output service to the user at a higher quality level comprises:
communicating information of processing capability with the second system; and
determining, based at least in part on the information of processing capability, whether the second system has processing capability that will result in the current information output service being provided to the user at a higher quality level than the current quality level.

19. The method of claim 13, wherein determining whether utilizing a resource of the second system in conjunction with the first portable system will provide the current information output service to the user at a higher quality level comprises determining whether at least one of the first portable system and the second system has communication capability necessary for utilizing the resource of the second system in conjunction with the first portable system to provide the current information output service to the user at a higher quality level.

20. The method of claim 13, wherein determining whether utilizing the resource of the second system in conjunction with the first portable system to provide the current information output service to the user at a higher quality level comprises determining whether the resource of the second system has access to music information encoded using a lower loss encoding technique than used to encode music information to which the first portable system has access.

21. The method of claim 13, wherein determining whether utilizing a resource of the second system in conjunction with the first portable system will provide the current information output service to the user at a higher quality level than the current quality level comprises determining, based at least in part on information communicated between the second system and the first portable system over the wireless communication link, whether utilizing a resource of the second system in conjunction with the first portable system will provide the current information output service to the user at a higher quality level than the current quality level.

22. In a second system in a wireless communication network, a method for allocating a resource of the second system to provide improved quality of service to a user, the method comprising:
establishing a wireless communication link with a first portable system, the first portable system currently providing a current information output service at a current quality level to a user;
communicating with the first portable system to determine whether utilizing a resource of the second system in conjunction with the first portable system will provide the current information output service to the user at a higher quality level than the current quality level, wherein said determining comprises determining whether the second system has access to information encoded using a lower loss encoding technique than used to encode information to which the first portable system has access; and
if it is determined that utilizing a resource of the second system in conjunction with the first portable system will provide the current information output service to the user at a higher quality level, then allocating the resource of the second system for such use.

23. The method of claim 22, further comprising utilizing the allocated resource of the second system in conjunction with the first portable system to provide the current information output service to the user at a higher quality level than the current quality level.

24. The method of claim 23, wherein utilizing resources of the second system in conjunction with the first portable system to provide the current information output service to the user comprises:
obtaining data corresponding to the current information output service from a storage device communicatively coupled to the second system through a computer network; and
communicating decoded audio information based on the obtained data to the first portable system.

25. The method of claim 23, wherein utilizing resources of the second system in conjunction with the first portable system to provide the current information output service to the user comprises automatically, without user interaction, utilizing resources of the second system to provide the current information output service to the user at a higher quality level.

26. The method of claim 22, wherein communicating with the first portable system to determine whether utilizing a resource of the second system in conjunction with the first portable system will provide the current information output service to the user at a higher quality level comprises communicating processing capability information with the first portable system, wherein the processing capability information is analyzed to determine whether utilizing a resource of the second system in conjunction with the first portable system will provide the current information output service to the user at a higher quality level.

27. The method of claim 22, wherein communicating with the first portable system to determine whether utilizing a resource of the second system in conjunction with the first portable system will provide the current information output service to the user at a higher quality level comprises communicating communication capability information with the first portable system, wherein the communication capability information is analyzed to determine whether utilizing a resource of the second system in conjunction with the first portable system will provide the current information output service to the user at a higher quality level.

28. The method of claim 22, wherein communicating with the first portable system to determine whether utilizing a resource of the second system in conjunction with the first portable system will provide the current information output service to the user at a higher quality level comprises communicating with the first portable system an indication of a type of encoding utilized to encode music information to which at least one of the first portable system and the second system has access, wherein the indication of a type of encoding is analyzed to determine whether utilizing a resource of the second system in conjunction with the first portable system will provide the current information output service to the user at a higher quality level.

29. The method of claim 22, wherein communicating with the first portable system to determine whether utilizing a resource of the second system in conjunction with the first portable system will provide the current information output service to the user at a higher quality level than the current quality level comprises communicating with the first portable system, over the wireless communication link, information related to service quality level to determine whether utilizing a resource of the second system in conjunction with the first portable system will provide the current information output service to the user at a higher quality level than the current quality level.

30. A first portable system for providing an information output service to a user in a wireless communication network, the first portable system comprising:
   a communication module adapted to establish a communication link with a second system in the wireless communication network;
   a user interface module;
   a local processing module, communicatively coupled to the user interface module, adapted to utilize the user interface module to provide a current information output service to a user at a current quality level;
   a quality control module, communicatively coupled to the communication module, adapted to communicate capability information with the second system to determine whether utilizing a resource of the second system in conjunction with the first portable system will provide the current information output service to the user at a higher quality level than the current quality level by, at least in part, determining whether the second system has access to information encoded using a lower loss encoding technique than used to encode information to which the first portable system has access; and
   a distributed processing module, communicatively coupled to the communication module, adapted to request allocation of the resource of the second system for providing the current information output service to the user at a higher quality level than the current quality level.

31. The first portable system of claim 30, wherein the distributed processing module is adapted to utilize the allocated resource of the second system to provide the current information output service to the user at a higher quality level than the current quality level.

32. The first portable system of claim 31, wherein the distributed processing module is adapted to receive decoded audio information from the second system, the decoded audio information being based on data that the second system obtained from a data storage device communicatively coupled to the second system through a computer network.

33. The first portable system of claim 31, wherein the distributed processing module is adapted to utilize the allocated resource of the second system automatically, without user interaction.

34. The first portable system of claim 30, wherein the quality control module is adapted to communicate processing capability information with the second system, the processing capability information being analyzed to determine whether utilizing a resource of the second system in conjunction with the first portable system will provide the current information output service to the user at a higher quality level than the current quality level.

35. The first portable system of claim 30, wherein the quality control module is adapted to communicate communication capability information with the second system, the communication capability information being analyzed to determine whether utilizing a resource of the second system in conjunction with the first portable system will provide the current information output service to the user at a higher quality level than the current quality level.

36. The first portable system of claim 30, wherein the quality control module is adapted to communicate with the second system an indication of a type of encoding utilized to encode music information to which at least one of the first portable system and the second system has access, the indication of the type of encoding being analyzed to determine whether utilizing a resource of the second system in conjunction with the first portable system will provide the current information output service to the user at a higher quality level than the current quality level.

37. A second system for providing an information output service to a user in a wireless communication network, the wireless communication network comprising a first portable system providing a current information output service to the user at a current quality level, the second system comprising:
   a communication module adapted to establish a communication link with the first portable system in the wireless communication network;
   a quality control module, communicatively coupled to the communication module, adapted to communicate capability information with the first portable system to determine whether utilizing a resource of the second system in conjunction with the first portable system will provide the current information output service to the user at a higher quality level than the current quality level by, at least in part, determining whether the second system has access to information encoded using a lower loss encoding technique than used to encode information to which the first portable system has access; and
   a resource allocation module adapted to allocate the resource of the second system for providing the current information output service to the user at a higher quality level than the current quality level.

38. The second system of claim 37, further comprising a distributed processing module adapted to utilize the allocated resource of the second system to provide the current information output service to the user at a higher quality level than the current quality level.

39. The second system of claim 38, further comprising a storage device communicatively coupled to the distributed processing module, and wherein the distributed processing module is adapted to obtain data corresponding to the current information output service from the storage device and communicate decoded audio information based on the obtained data to the first portable system.

40. The second system of claim 38, wherein the distributed processing module is adapted to automatically utilize the allocated resource of the second system, without user interaction, to provide the current information output service to the user at a higher quality level than the current quality level.

41. The second system of claim 37, wherein the quality control module is adapted to communicate processing capability information with the first portable system to determine whether utilizing a resource of the second system in conjunction with the first portable system will provide the current information output service to the user at a higher quality level than the current quality level.

42. The second system of claim 37, wherein the quality control module is adapted to communicate communication capability information with the first portable system to determine whether utilizing a resource of the second system in conjunction with the first portable system will provide the current information output service to the user at a higher quality level than the current quality level.

43. The second system of claim 37, wherein the quality control module is adapted to communicate with the first portable system an indication of a type of encoding utilized to encode music information to which at least one of the first portable system and the second system has access, wherein the indication of a type of encoding is analyzed to determine whether utilizing a resource of the second system in conjunction with the first portable system will provide the current information output service to the user at a higher quality level than the current quality level.

* * * * *